Nov. 1, 1949.  H. O. FEILBACH  2,486,397
AUTOMATICALLY SELF-RELEASING AIRCRAFT LANDING HOOK
Filed April 28, 1943
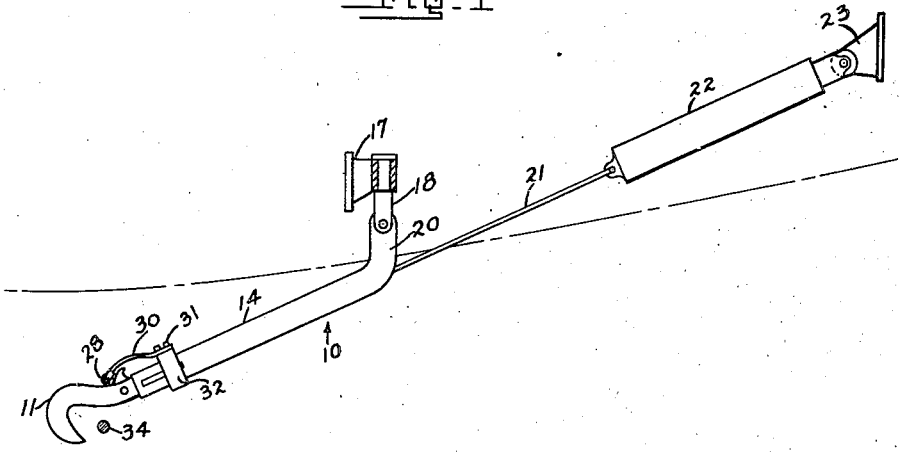
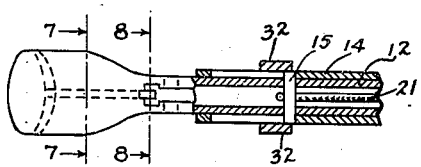
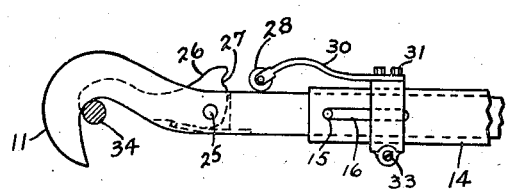
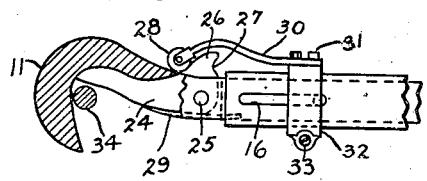
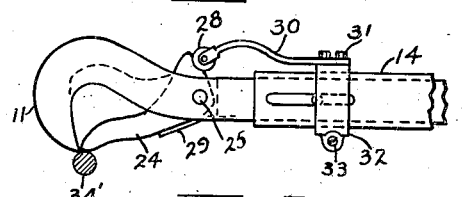
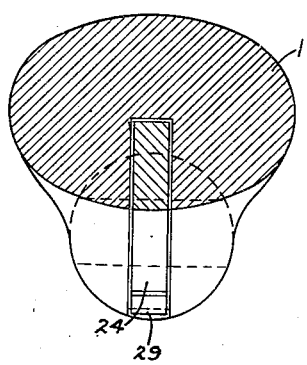
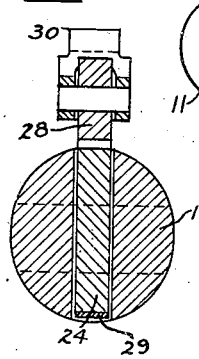
INVENTOR
Harvey O. Feilbach
BY
ATTORNEY Patented Nov. 1, 1949

2,486,397

UNITED STATES PATENT OFFICE 2,486,397

AUTOMATICALLY SELF-RELEASING AIRCRAFT LANDING HOOK

Harvey O. Feilbach, United States Navy

Application April 28, 1943, Serial No. 484,852

3 Claims. (Cl. 244—110)

(Granted under the act of March 3, 1883, as amended April 30, 1928; 370 O. G. 757)

This invention relates broadly to improvements in landing or arresting hooks for aircraft, and more particularly to means in the arresting hook for accomplishing the quick and automatic release of the hook of an aircraft after the same has landed and engaged the transverse retarding cable upon a restricted landing area so equipped and which will release the aircraft immediately after its movement has been reduced to a certain predetermined maximum speed.

The primary object of this invention is to provide an aircraft landing equipment with an automatically self-releasing mechanism for disengaging the transverse retarding cable from the arresting hook after the speed of the aircraft has been reduced from substantially landing speed to substantially taxiing speed, thus enabling the aircraft to immediately continue at a taxiing speed to its parking area from the landing area without the necessity of being backed up on the landing area to disengage the hook, thus making the landing area more quickly available to a succeeding aircraft for landing purposes.

Still a further object of this invention is to provide an automatically self-releasing landing hook which is self-resetting.

Still a further object of this invention is to provide a means for adjusting the mechanism to operate the self-releasing features at any desired tension on the hook, thereby making the mechanism adjustable both for the weight of the aircraft to which it is attached, and according to the aircraft speed at which it is desired that it should operate.

Still a further object of the invention is to provide, in conjunction with an automatically releasing aircraft arresting hook, means for absorbing the shock imposed upon the landing hook when striking the landing platform, thereby reducing, or eliminating, hook bounce.

With the foregoing and other objects in view, one form of the invention consists in the construction, combination and arrangement of the parts hereinafter described and illustrated in the drawings, in which:

Fig. 1 is a side plan view showing the landing hook of this invention as extending through the bottom of the aircraft to which it is attached.

Fig. 2 is a top plan view, partly in section, of the hook end.

Fig. 3 is a side view, partly in section, of the hook in the cable-engaging position before any retarding effect has been applied to the hook by the transverse retarding cable.

Figs. 4, 5 and 6, respectively, are similar views, showing the progressive operation of the mechanism; and Figs. 7 and 8 are sectional views on lines 7—7 and 8—8 of Fig. 2.

There is shown at 10 the landing or arresting hook of this invention. This arresting hook includes a hook head 11 of conventional shape but having its shank 12 hollow and reciprocable within a guide tube 14, the relative movement of the shank 12 and the tube 14 being restricted by a transverse pin 15 extending through the shank and movable in opposed slots 16 in the tube 14. The guide tube 14 is secured to the structure of the aircraft by means of a bracket 17 through a universal swivel joint 18. The arresting load is not taken up by tube 14, but instead is transmitted through cable 21, one end of which is secured to pin 15 in shank 12, and extends through the hollow shank 12 and tube 14 to the point of attachment of its other end on shock absorbing strut 22. The other end of the shock strut is secured by means of a bracket 23 to the internal structure of the aircraft. Small residual recoil forces in oleo shock strut 22 act through cable 21 to maintain the hook shank 12 retracted to a normal position within guide tube 14. Because of the bent end 20 of guide tube 14, aforesaid residual tensile force in cable 21 has a moment about the horizontal pivot in joint 18, thereby opposing the moment about aforesaid pivot that is developed when the hook is forced upwards due to contact with, or impinging upon, the landing platform.

The neck region of the hook head 11 is slotted to receive a throw-out lever 24 therein, this throw-out lever being pivoted by means of a pin 25 and is provided with a cam projection 26 extending entirely through the back of the neck portion of the hook head. This projection 26 is provided on its rear side with a curved recess 27 of the same radius as the radius of a roller 28 which is journalled on the end of a strong leaf spring 30. This leaf spring 30 is secured by stud bolts 31 to a clamping bracket 32 adapted to be secured by means of clamping bolts 33 adjustable along the outside of the hook end of tube 14. If desired, the bracket 32 can be made more secure on the tube 14 by any conventional friction increasing means, including serrations on the inner faces of the arms of the bracket 32. The throw-out lever 24 is normally held in retracted position against the inner side of the hook throat 11 by means of a comparatively weak spring 29.

This invention is not, however, limited to the particular throw-out lever shown. Thus, the throw-out lever could consist of a tongue shaped lever that conforms to the contour of the inner hook throat, with a profile on the cable ejecting surface similar to that of the lever shown, the sides to turn up to parallel each other and straddle the hook shank in the region of the pin 25, to provide a bearing support for a pivot at that point, the said sides to be further bent around the hook shank to join at the back of the hook to form the cam profile 26 illustrated, the lever to be held in the retracted position by a spring on either side.

In operation, when the hook 11 engages retarding cable 34 it is in the position shown in Figs. 1 and 3. Then as the retarding force takes effect, the hook shank 12 slides through the tube 14 toward the limit permitted by the shock strut and indicated by the movement of the pin 15 in the slots 16, while the shock is taken up and transmitted by the cable 21 to the oleo strut 22. As this takes place the cam 26 of the throw-out lever 24 passes under the roller 28 to the disengaged position shown in Fig. 4. When the arresting forces have diminished to a relatively minor value, due to the aircraft having been stopped or decelerated to substantially a taxiing speed, the recoil within the oleo strut moves the hook shank 12 toward the retracted position within the tube 14, thereby causing the recess 27 of the cam 26 of the throw-out lever 24 to be contacted by the roller 28. The recess 27 is of such concave arcuate contour that the roller 28 is retained therein throughout the limits indicated by Figs. 4 and 5. As the retraction of the shank within the tube continues, the pressure of the roller 28 against the recess 27 of cam 26 of the throw-out lever 24 causes the throw-out lever 24 to move the cable 34 to the position 34' of Fig. 5, thereby ejecting it from the hook head 11. Immediately that this is done, the throw-out lever 24 then pivots a relatively small additional amount, whereupon the recess 27 and adjacent cam surface present an incline, up and over which the roller is forced by the continued recoil of the hook. As soon as the cam 26 has come under the roller 28, as shown in Fig. 6, the spring 29 pivots the lever 24 about its pivot 25 and restores it to the position shown in Figs. 1 and 3, immediately ready for operation again at any time. Thereafter, the pilot may continue to taxi his aircraft to the desired parking location. Obviously by adjusting the bracket 32 to a desired location on the tube 14, the moment of release of the retarding cable 34 from the hook throat 11 can be varied as desired so as to select at what speed the aircraft will be moving when released from the transverse retarding cable 34.

Other modifications and changes in the number and proportions of the parts may be made by those skilled in the art without departing from the nature of this invention, within the scope of what is hereinafter claimed.

The invention described herein may be manufactured and used by or for the Government of the United States of America for governmental purposes without the payment of any royalties thereon or therefor.

What is claimed is:

1. An automatically self-releasing aircraft arresting hook for cooperation with a transverse retarding cable, means carried by said hook for separating said hook from cooperation with said transverse cable when the tension on said hook is diminished to a predetermined amount, said means including a hook head, a throw-out lever pivoted in said hook head, yieldable means normally holding said throw-out lever retracted with respect to said hook head, an extension on said throw-out lever extending behind said hook head, and camming means for abutting said throw-out lever extension to pivot said extension and eject the transverse retarding cable from said hook throat.

2. An automatically self-releasing aircraft arresting hook for cooperation with a transverse retarding cable, means carried by said hook for separating said hook from cooperation with said transverse cable when the tension on said hook is diminished to a predetermined amount, said means including a hook head, a throw-out lever pivoted in said hook head, yieldable means normally holding said throw-out lever retracted with respect to said hook head, an extension on said throw-out lever extending behind said hook head, camming means for abutting said throw-out lever extension to pivot said extension and eject the transverse retarding cable from said hook throat, and means for adjustably mounting said camming means relative to the range of movement of the hook throat.

3. An automatically self-releasing aircraft arresting hook for cooperation with a transverse retarding cable, means carried by said hook for separating said hook from cooperation with said transverse cable when the tension on said hook is diminished to a predetermined amount, said means including a hook head, a throw-out lever operating in conjunction with said hook head, yieldable means normally holding said throw-out lever retracted with respect to said hook head, an extension on said throw-out lever extending behind said hook head, camming means for abutting said throw-out lever extension to actuate said throw-out lever and eject the transverse retarding cable from said hook throat, means for mounting said camming means with provision for adjustment relative to the range of movement of the hook throat, said latter means including a tube, means for pivotally securing said tube to the aircraft, an arm securing said camming means to said tube, and a shock absorbing member securing said hook head to the aircraft, said hook head having limited movement in said tube, said camming means normally extending behind said throw-out lever cam but being retractable to a position forward of said cam as the hook head is placed under tension by contacting with the transverse retarding cable, said camming means returning to said position behind the cam as the tension is released from the hook head.

HARVEY O. FEILBACH.

REFERENCES CITED

The following references are of record in the file of this patent:

UNITED STATES PATENTS

| Number | Name | Date |
|--------|------|------|
| 398,060 | Lewellen | Feb. 19, 1889 |
| 722,721 | Lamb | Mar. 17, 1903 |
| 1,026,469 | Senacol | May 14, 1912 |
| 1,845,466 | Williams | Feb. 16, 1932 |
| 1,994,646 | Heath | Mar. 16, 1935 |
| 2,276,312 | Jurschick | Mar. 17, 1942 |

FOREIGN PATENTS

| Number | Country | Date |
|--------|---------|------|
| 22,404 | Great Britain | 1912 |
| 99,113 | Switzerland | Jan. 13, 1922 |